Aug. 15, 1950     J. B. COMPTON     2,519,114
AXIALLY SHIFTING TYPE, FLUID PRESSURE
OPERATED TIRE REMOVER AND APPLIER
Filed June 10, 1946     4 Sheets-Sheet 4
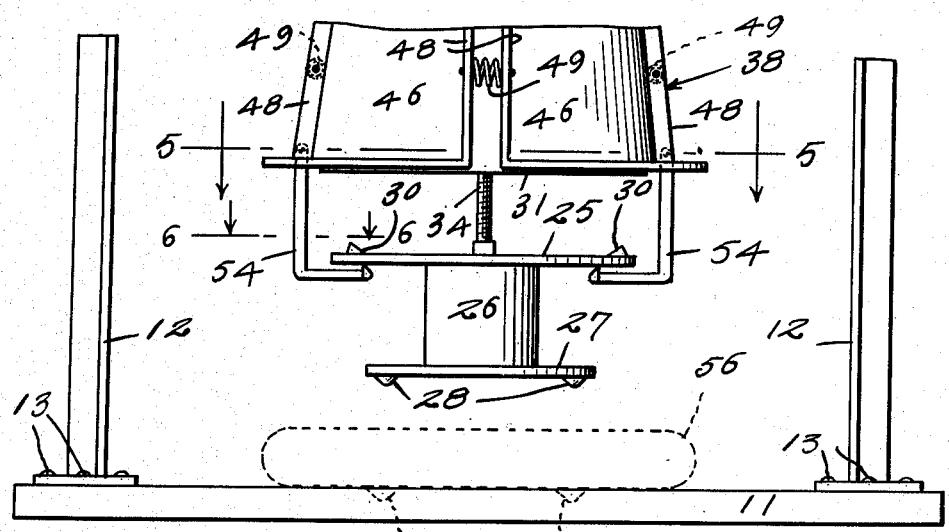
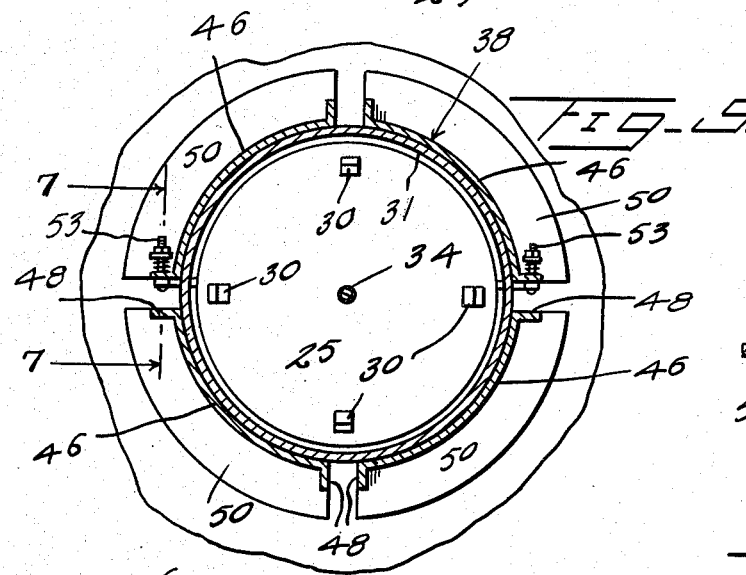
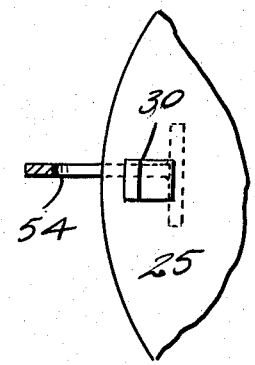
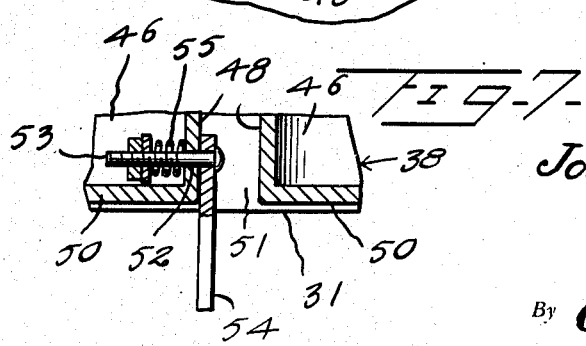
Inventor
Joseph B. Compton
By Randolph & Beavers
Attorneys Patented Aug. 15, 1950

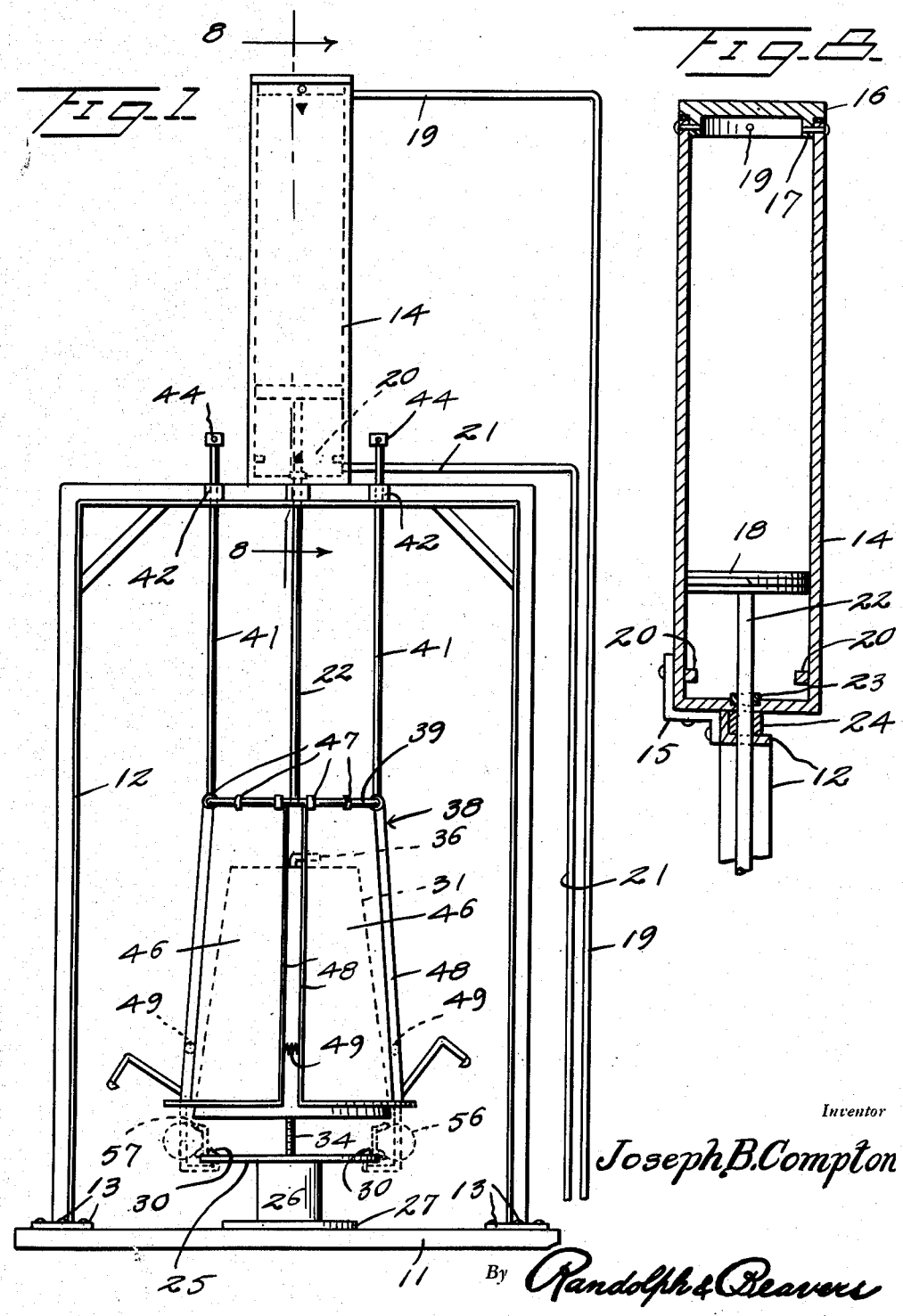

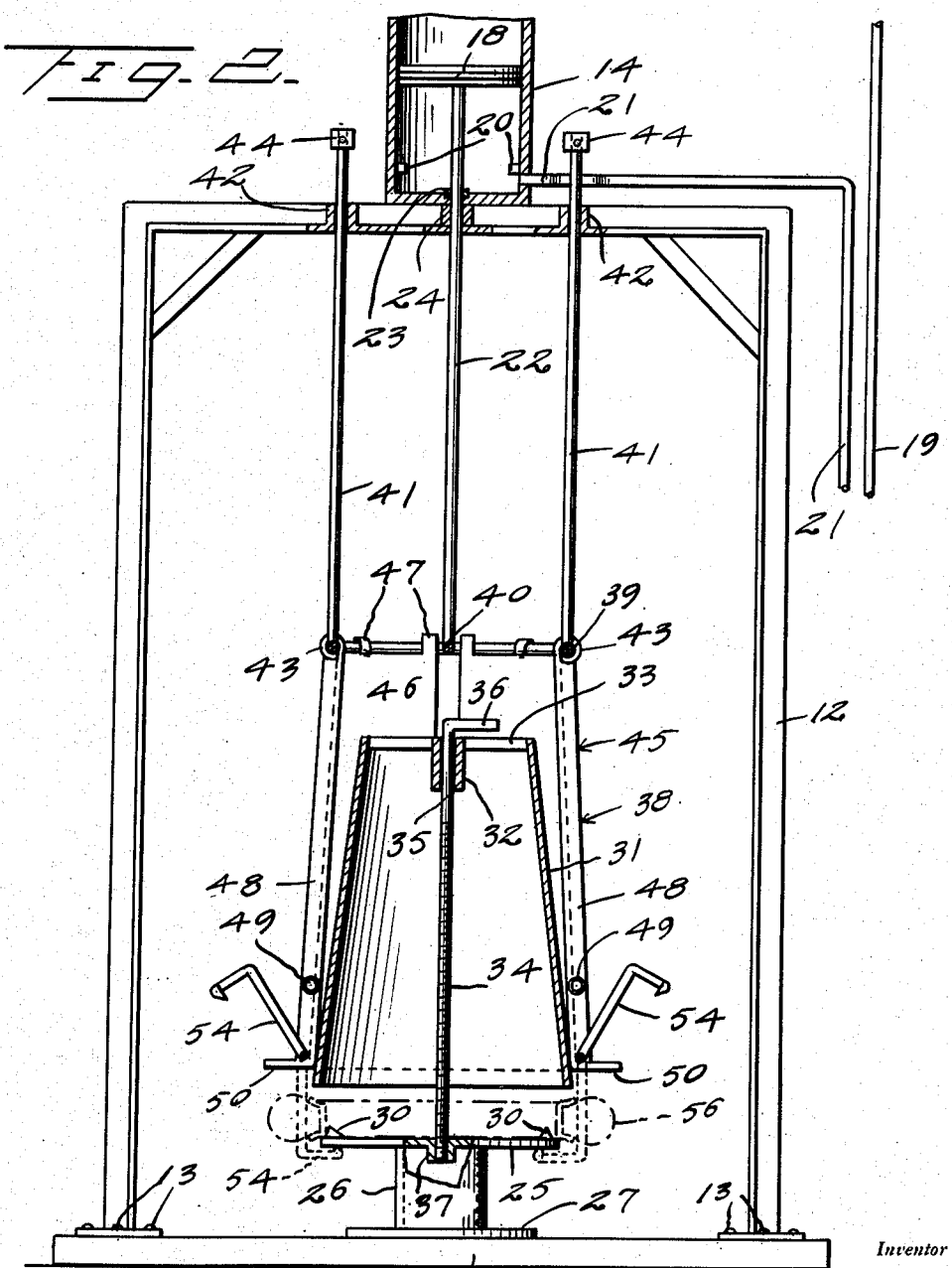

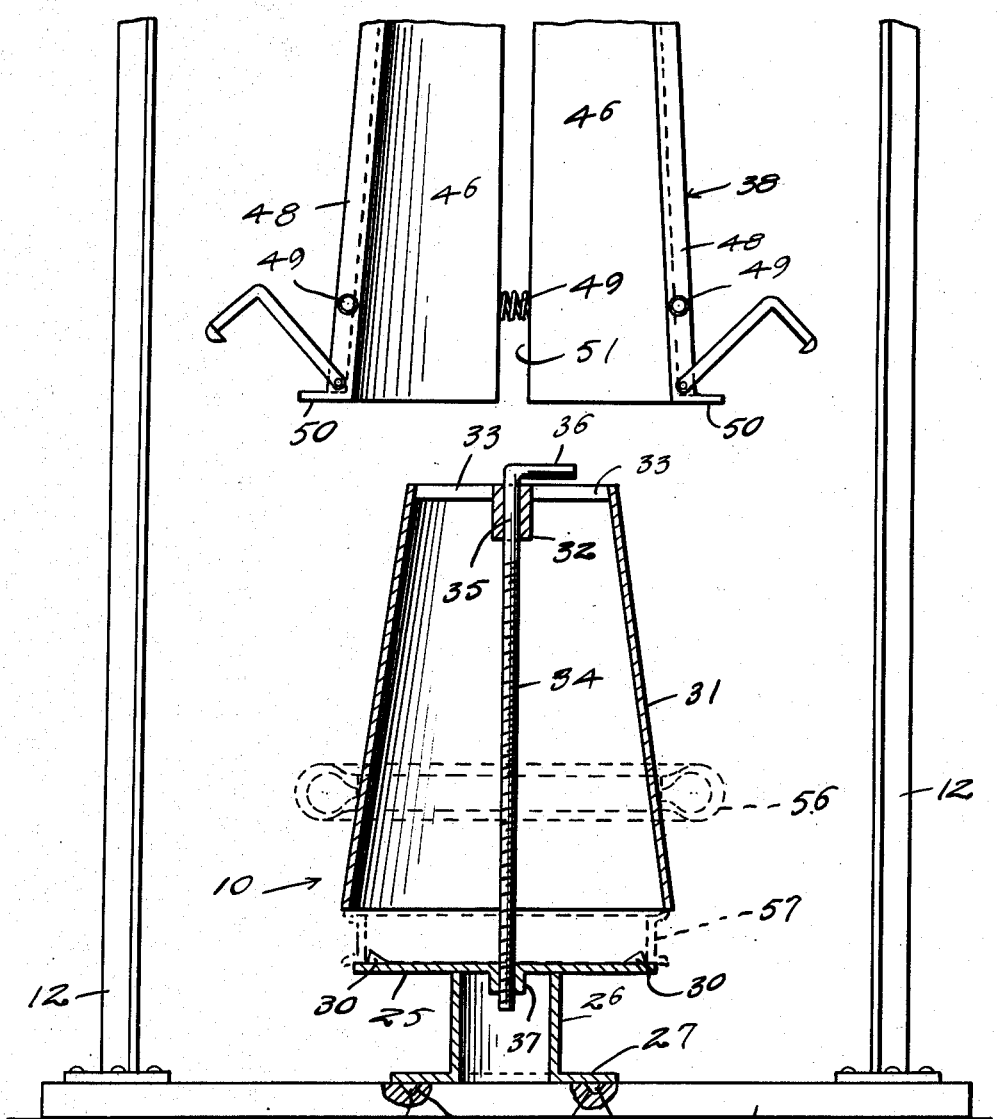

2,519,114

UNITED STATES PATENT OFFICE 2,519,114

AXIALLY SHIFTING TYPE, FLUID PRESSURE OPERATED TIRE REMOVER AND APPLIER

Joseph B. Compton, Jacksonville, Fla., assignor of one-half to Grace A. Jones, Jacksonville, Fla.

Application June 10, 1946, Serial No. 675,739

4 Claims. (Cl. 157—1.2)

This invention relates to a machine for use in removing pneumatic tires from and applying tires to a wheel or rim and has for its primary object to provide a power actuated machine which will operate quickly and efficiently for applying and removing a tire and thereby eliminate the time consuming manual labor customarily required to accomplish these operations.

More particularly, it is an aim of the invention to provide a readily adjustable machine capable of use for applying and removing tires of various sizes to and from their wheels or rims which is capable of being actuated by pneumatic or hydraulic means for performing the operation.

Other objects and advantages of the invention will hereinafter become more fully apparent from the following description of the drawings, which illustrate a preferred embodiment thereof, and wherein:

Figure 1 is a side elevational view of the machine;

Figure 2 is an enlarged side elevational view partly in vertical section thereof;

Figure 3 is a fragmentary vertical sectional view on an enlarged scale and partly in vertical section and showing the ram retracted, preparatory to applying a tire to a rim;

Figure 4 is an enlarged side elevational view of the lower portion of the machine and with the parts in a raised position;

Figures 5 and 6 are horizontal sectional views taken substantially along planes as indicated by the lines 5—5 and 6—6, respectively, of Figure 4;

Figure 7 is a vertical sectional view taken substantially along a plane as indicated by the line 7—7 of Figure 5;

Figure 8 is an enlarged longitudinal sectional view taken substantially along a plane as indicated by the line 8—8 of Figure 1, and Figure 9 is an enlarged fragmentary sectional view of a portion of the machine as shown in Figure 3.

Referring more specifically to the drawings, the numeral 10 designates the tire applying and removing machine in its entirety and which includes a base 11 which is adapted to be disposed on any suitable supporting surface and which supports an arch-shaped frame 12 which extends upwardly therefrom and the ends of which are secured thereto by fastenings 13. The frame 12 is preferably formed of angle iron.

An elongated cylinder 14 is mounted in an upright position on the intermediate portion of the frame 12 and is fastened thereto by a bracket 15, as seen in Figure 8. The cylinder 14 is provided with a removable head 16 at its upper end having depending lugs 17 which are fastened to the cylinder and which form a stop for limiting the upward movement of a piston 18, which is reciprocally disposed within the cylinder 14. As seen in Figure 8, the lugs 17 extend to below the level of a pipe 19 at the point where it communicates with the interior of the upper end of the cylinder 14. The cylinder 14 is provided with stops 20 adjacent its lower end which are disposed above the level of the point of communication of a pipe 21 with the interior of the cylinder 14, for a purpose which will hereinafter be described. The piston 18 is provided with a connecting rod 22 which extends downwardly therefrom through aligned openings in the bottom wall of the cylinder 14 and in the intermediate portion of the arch 12, as seen in Figure 8. A sealing gasket 23 and a sleeve 24 is preferably provided for the connecting rod 22 to work through to afford a connection which is substantially leakproof.

A table 25 is supported above the base 11 by a pedestal 26 having a base 27 which rests on the base 11 and which is provided with depending teats 28 which fit into recesses 29 of the base 11 for correctly positioning table 25 thereabove, as best seen in Figure 3. The table 25 is provided with a plurality of upstanding lugs 30 for a purpose which will hereinafter be described.

A frusto-conical guide 31 is disposed above the table 25 and with the enlarged end thereof adjacent to said table. The guide 31 is provided with an axially disposed sleeve 32 which is supported in the upper restricted portion thereof by radial arms 33. A screw 34 is provided with an unthreaded upper portion 35 which turnably and reciprocally engages in the sleeve 32 and which terminates in a laterally projecting lever portion 36 which is disposed above the sleeve 32 and the guide 31. The table 25 is provided with a centrally disposed flanged opening 37 which is internally threaded to threadedly engage the lower portion of the bolt 34 and which is disposed in alignment with the sleeve 32.

A ram, designated generally 38 includes a supporting ring 39 which is provided with a diametrically disposed rod 40, the intermediate portion of which is connected to the lower end of the piston rod 22. A pair of guide rods 41 are reciprocally mounted in flanged openings 42 of the intermediate portion of the arch 12 and are provided with eyes 43 at their lower ends which engage diametrically opposed portions of the ring 39. The guide rods 41 are provided with detachable collars 44 at their upper ends and which are disposed above the intermediate portion of the arch 12 to limit the downward movement of said guide rods, and consequently, the downward movement of the ram 38.

The ram 38 includes a split sleeve 45 formed of four corresponding elongated sections 46 each of which is arcuate-shaped in cross section. The sections 46 are provided with hangers 47 at their upper ends which turnably engage the ring 39 for supporting the strips 46 in depending relationship thereto. The side edges of the sleeve sections or strips 46 are provided with outturned longitudinal flanges 48 which are disposed in spaced apart relationship to the flanges of adjacent sections 46. The adjacently disposed flanges 48 are yieldably connected by contractile springs 49, adjacent the lower end of the sleeve 45 which act to contract the lower end of said sleeve. The sleeve sections 46 are each provided with an outturned lower end forming a flange or shoulder 50. The ends of the flanges or shoulders 50 are disposed in the same vertical plane as the contiguous flanges 48 so that said flanges 48 and 50 combine to form longitudinally extending gaps 51 between the sleeve sections 46 and in which the springs 49 are disposed. As best seen in Figure 7, certain of the flanges 48 are provided with openings 52 adjacent their lower ends to receive nut and bolt fastenings 53. The shanks of the fastenings 53 extend through the openings 52 and the headed ends of said fastenings are disposed in the gaps 51. A hook 54 is pivotally mounted at its shank end on each of the fastenings 53 and with its shank end disposed in a gap 51, as clearly illustrated in Figure 7. Each of the fastenings 53 carries an expansion spring 55 which acts to frictionally clamp the shank end of the hook 54 between the headed end of its fastening 53 and the flange 48 in which said fastening is disposed, for maintaining the hooks 54 in any position in which they are placed. As seen in Figure 4, the hooks 54 are mounted so that the hook-shaped free ends thereof project inwardly when the shanks of the hooks are in depending positions.

The conduits 19 and 21 are adapted to be connected to a suitable source of compressed air, not shown, or may be connected to a suitable source of hydraulic fluid under pressure, and are provided with conventional valve means, not shown, whereby when the compressed air is being admitted through one of the pipes 19 or 21, the other pipe will be exposed to the atmosphere for bleeding off the air therethrough.

With the foregoing in view, and assuming that it is desired to remove a pneumatic tire from its rim or wheel, the lever 36 is turned to disengage the bolt 34 from the threaded bore 37. Compressed air is admitted to the lower end of the cylinder 14, sufficiently to raise the piston 18 a short distance and at the same time, the air above the piston is bled from the upper part of the cylinder 14 through the other pipe 19. This upward movement of the piston 18 will cause the ram 38 to rise relatively to the table 25 and as the springs 49 are yieldably retaining the lower portion of the ram 38 in frictional engagement with the guide 31, said guide will also be raised. When the ram 38 with the guide 31 supported thereby is thus raised, a pneumatic tire 56 mounted on a rim or wheel 57, as seen in dotted lines in Figures 1 and 2, can be placed on the table 25. The lugs 30 will engage the rim or wheel 57 to properly center the parts 56 and 57 with respect to the table 25. Sufficient compressed air is then admitted to the upper end of the cylinder 14 through the conduit 19 and a similar amount of compressed air is released through the conduit 21 from the lower end of the cylinder 14, to permit the piston 18 to move downwardly to lower the ram 38 and guide 31 until the enlarged, lower end of the guide 31 is in engagement with the rim 57. The bolt 34 is then engaged with the threaded bore 37 and tightened to securely retain the lower enlarged end of the frusto-conical guide 31 in engagement with the rim 57. It is noted that the external diameter of the enlarged end of the guide 31 is substantially equal to the external diameter of the rim 57. Consequently, by admitting additional compressed air to the upper end of the cylinder 14, the ram 38 will be caused to move downwardly relatively to the frusto-conical guide 31 and the sections 46 of the ram 38 will be swung outwardly at their lower ends on the pivot 47 as said lower ends ride over the frusto-conical guide 31 and toward its enlarged lower end. During this operation, the hooks 54 are in raised position, as illustrated in Figures 1 and 2. The guide 31 will cause the shoulders 50 to clear the rim 57 as said shoulders move beyond the lower end of the guide 31. Therefore, the shoulders 50 will engage the upper side wall of the tire 56 and by further movement of the ram 38 in a downward direction, will force the tire downwardly and off of the rim or wheel 57 and thereby cause the tire to drop onto the base 11.

If the tire beads are struck to the rim flanges, after the ram has moved downwardly sufficiently to break the upper tire bead from the upper rim flange, compressed air is admitted to the lower end of the cylinder 14 to elevate the ram 38 and thereafter the bolt 34 is disengaged from the bore 37 and the ram 38 and guide 31 as a unit is thereafter elevated relatively to the table 25, as previously described. The wheel and tire are then inverted and the operation of exerting a downward force on the upper side of the tire is then repeated and continued until the tire is forced completely off of the wheel or rim 57.

Hooks 54 are then swung downwardly and inwardly to engage under the table 25 and by applying air pressure to the underside of the piston 18, the ram 38, guide 31 and table 25 can be raised, as seen in Figure 4, so that the tire 56 can be removed for whatever repair work may be required to the tire or tube. The piston 18 is then caused to move downwardly to return the parts to the position as seen in Figure 2, after which the hooks 54 are swung upwardly to disengage the table 25 which is thus again positioned with the teats 28 thereof engaging in the recesses 29 for properly locating the table 25 beneath the guide 31 and ram 38.

The screw 34 can then be disengaged from the bore 37, and the ram 38 and guide 31 can then be raised, as previously described, to remove the rim or wheel 57 so that another wheel or rim and tire may be applied thereto.

For applying the tire 56 to the rim 57, the rim is placed on the table 25 in the same manner, as previously described, after which the ram 38 and guide 31 are moved downwardly to cause the enlarged end of the guide 31 to engage the rim 57, as illustrated in Figure 3, after which the bolt 34 is engaged with the threaded bore 37 and tightened to secure the lower end of the guide 31 tight against the rim 57. The piston 18 is then caused to move upwardly and in so moving the ram 38 will be carried upwardly relatively to the guide 31. The ram 38 is moved to a point above the guide 31, as seen in Figure 3, so that the tire 56 can be inserted between the guide 31 and ram 38 and positioned on the guide 31. Compressed air is then admitted to the upper end of the cylinder 14 to force the piston 18 downwardly, so that the ram 38 will move downwardly and over the guide 31 to cause the shoulders 50 thereof to move into engagement with the upper side wall of the tire 56. Further movement of the ram 38 in a downward direction will force the tire 56 downwardly on the guide 31 and off of the enlarged lower end thereof and into the channel of the rim or wheel 57 to thus reapply the tire 56 to the rim or wheel 57. As the external diameter of the lower end of the guide 31 is equal to the external diameter of the flanges of the rim or wheel 57, the tire 56 will pass readily over the upper rim or wheel flange and contract readily into the rim channel.

During this operation as during the operation of removing the tire from the rim, the hooks 54 will be in their raised position as illustrated in Figures 1, 2 and 3.

Various modifications and changes are contemplated and may obviously be resorted to without departing from the spirit and scope of the invention as hereinafter defined by the appended claims.

I claim:

1. In a tire applier and remover, a frame having a base portion and an arch portion, a table removably supported by said base portion and adapted to support a rim or wheel and tire, a frusto-conical guide disposed above and detachably connected to said table and with its enlarged and disposed adjacent thereto, a sleeve-like ram reciprocally disposed in said frame for movement toward and away from the table, said ram being movable over said guide and being provided with expansible means to permit expansion of the ram by engagement with the guide, and actuating means for raising and lowering said ram, said actuating means being operable to move said ram downwardly, guided by said guide, into engagement with the tire for forcing the tire downwardly and off of the rim.

2. A tire remover and applier as in claim 1, and hooks carried by the ram and swingable into engagement with the table for raising the table when the ram is elevated to permit removal of the tire from the frame and beneath said table.

3. A tire applier and remover as in claim 1, said ram comprising a plurality of arcuate sections hingedly supported at their upper ends and having depending side edges disposed in spaced relationship, contractile spring means connected to said depending side edges for urging the lower ends of the sections inwardly, and said sections having outturned lower ends forming shoulders adapted to bear against a side wall of the tire.

4. In a machine for applying or removing pneumatic tires from their wheels or rims, a platform adapted to support a wheel or rim, a frusto-conical guide disposed above said platform and with its enlarged end adjacent thereto, fastening means for detachably connecting said guide to the platform and for moving the enlarged end of the guide into engagement with the rim or wheel, said guide being adapted to have a pneumatic tire positioned thereover, and a ram reciprocally mounted for movement toward and away from the platform and guide and over said guide, said ram including an expansible sleeve disposed for telescoping engagement with the guide and movable thereon for engaging and forcing the tire downwardly on the guide and off of the guide and onto the rim or wheel.

JOSEPH B. COMPTON.

REFERENCES CITED

The following references are of record in the file of this patent:

UNITED STATES PATENTS

| Number | Name | Date |
|---|---|---|
| 601,088 | Verel | Mar. 22, 1898 |
| 1,467,122 | Snell | Sept. 4, 1923 |
| 1,564,496 | Staugaard | Dec. 8, 1925 |
| 2,263,690 | Bradley | Nov. 25, 1941 |
| 2,416,195 | Mitchell | Feb. 18, 1947 |

FOREIGN PATENTS

| Number | Country | Date |
|---|---|---|
| 815,829 | France | Apr. 19, 1937 |